United States Patent [19]
Zoller

[11] Patent Number: 5,520,765
[45] Date of Patent: May 28, 1996

[54] METHOD OF MANUFACTURING A HOLLOW MOLDING

[75] Inventor: Robert A. Zoller, Bay Village, Ohio

[73] Assignee: The Standard Products Company, Cleveland, Ohio

[21] Appl. No.: 275,923

[22] Filed: Jul. 14, 1994

Related U.S. Application Data

[63] Continuation of Ser. No. 724,874, Jul. 2, 1991, abandoned.

[51] Int. Cl.$^6$ .............................. B32B 1/10; B60R 13/06
[52] U.S. Cl. ..................... 156/245; 52/716.5; 156/292; 156/321; 293/128; 296/207; 428/31
[58] Field of Search .................................. 156/290–292, 156/60, 242, 245, 321, 322; 428/31, 71, 354, 188; 293/1, 128; 296/207; D12/190, 195, 196; 52/716.5, 716.6, 716.7

[56] References Cited

U.S. PATENT DOCUMENTS

| | | | |
|---|---|---|---|
| D. 111,111 | 8/1938 | Snyder | D12/190 |
| D. 177,800 | 5/1956 | Exner | D12/190 |
| D. 214,039 | 5/1969 | Dick | D12/190 |
| 982,764 | 1/1911 | Burk | 52/717.1 |
| 3,572,798 | 3/1971 | Kunevicius | 52/716 |
| 4,010,297 | 3/1977 | Wenrick | 52/716 |
| 4,172,745 | 10/1979 | Van Manen | 156/160 |
| 4,246,303 | 1/1981 | Townsend | 52/717.1 |
| 4,351,868 | 9/1982 | Otani | 293/1 |
| 4,368,225 | 1/1983 | Nussbaum | 52/716 |
| 4,542,926 | 9/1985 | Treber | 293/128 |

FOREIGN PATENT DOCUMENTS

| | | | |
|---|---|---|---|
| 2521503 | 8/1983 | France | 428/31 |
| 1204952 | 11/1965 | Germany | 296/207 |
| 0188736 | 11/1983 | Japan | 428/31 |
| 0075849 | 4/1984 | Japan | 293/128 |

OTHER PUBLICATIONS

*The Vanderbilt Rubber Handbook*, George G. Winspew, ed., published by R. T. Vanderbilt Co., Inc., 1958, pp. 399, 508–515.

*Primary Examiner*—Daniel J. Stemmer
*Attorney, Agent, or Firm*—Harness, Dickey & Pierce

[57] ABSTRACT

A method of manufacturing a trim strip with hollow cavities having an elongated strip portion with at least a pair of side walls defining a valley between the side walls. A backing strip is bonded to the elongated strip portion. The trim strip is formed having a hollow cavity defined by the side walls and the backing strip.

5 Claims, 2 Drawing Sheets

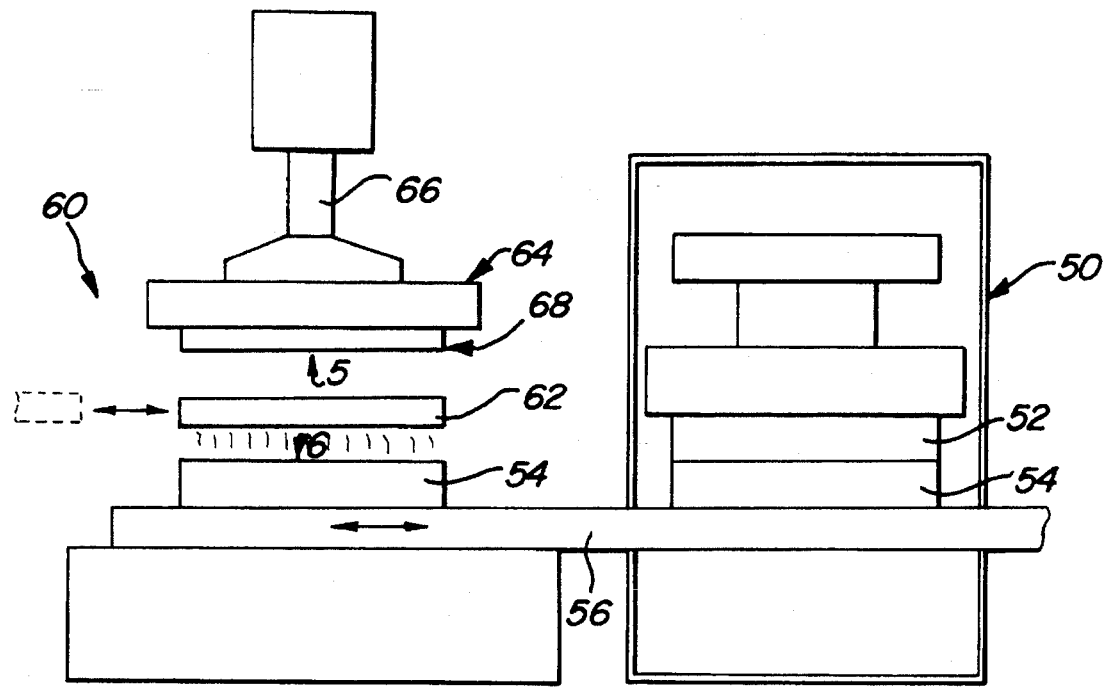
Fig-4
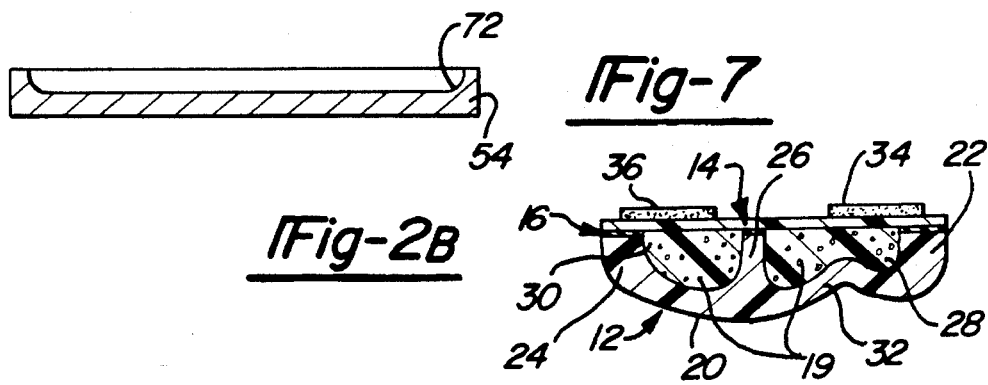
Fig-7
Fig-2B
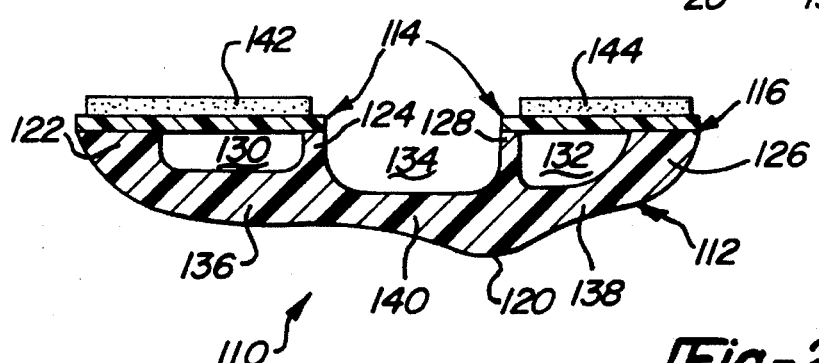
Fig-2A

5,520,765

METHOD OF MANUFACTURING A HOLLOW MOLDING

This is a continuation of U.S. patent application Ser. No. 724,874, filed Jul. 2, 1991, now abandoned.

BACKGROUND AND SUMMARY OF THE INVENTION

The present invention relates to trim strips and, more particularly, to trim strips and a method of manufacturing trim strips with a hollow cavity.

In the past, molded trim strips with hollow cavities have been manufactured by blow molding or by a composite construction. These methods produce trim strips with high profiles and significant weights. The trim strips generally extend a substantial distance away from the surface, such as an automotive vehicle. Generally this is due to the fact that to manufacture these trim strips they require a substantial amount of material. This material adds to the cost of producing the trim strips, as well as increasing the weight of the trim strip.

The thick composite trim strips, when metallic colors are used, ordinarily exhibit metallic flow lines. These metallic flow lines deter the appearance of the trim strip rendering it non-useable. The composite trim strips also include end caps. These end caps create non-desirable joint lines between the end caps and the strip.

It is desirable to have a trim strip which reduces the overall cost and weight of the strip. Likewise, it is desirable to have a trim strip which provides a high gloss metallic colored finish with little or no metallic flow lines. Also, the trim strip should have a continuous surface with contoured finished ends.

Accordingly, the present invention provides the art with such a trim strip. The present invention provides a light weight hollow trim strip which is relatively inexpensive to manufacture. The present invention also provides a method which enables the molded strip portion to shrink prior to the addition of the backing strip to substantially eliminate chordal height problems. The present invention provides for a trim strip that is straight or curved longitudinally to enable full bonding capability and attachment to a surface.

BRIEF DESCRIPTION OF THE DRAWINGS

FIG. 2A is a cross-section view like that of FIG. 2 of another embodiment of the present invention.

FIG. 2B is a cross-section view like that of FIG. 2 of another embodiment including a foam insert.

FIG. 4 is a schematic of an apparatus for carrying out the method of the present invention.

FIG. 7 is a cross-section of FIG. 6 through line 7—7 thereof.

DETAILED DESCRIPTION OF THE PREFERRED EMBODIMENT

Figure 1:
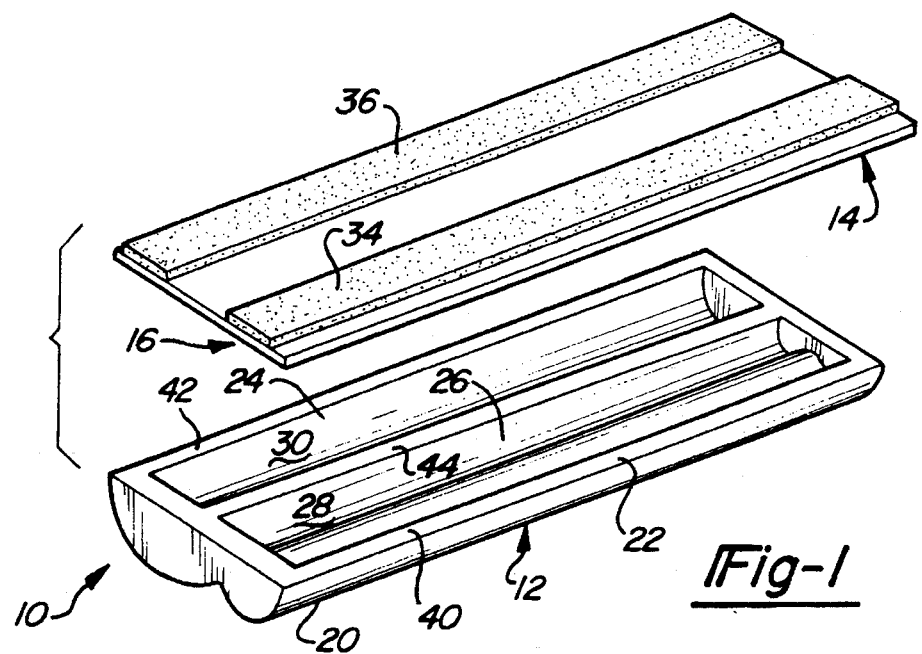
FIG. 1 is a perspective exploded view of a trim strip in accordance with the present invention.

Turning to the Figures, particularly FIG. 1, a trim strip manufactured from the method of the present invention is illustrated and designated with the reference numeral 10. The trim strip 10 includes an elongated strip portion 12, a backing strip 14, and a bonding member 16 to secure the strip portion and backing strip together.

The strip portion 12 has an outer surface 20 which provides the trim strip with its aesthetic appearance. The strip portion 12, in cross-section, includes at least a pair of legs 22 and 24 and an optional leg 26. The legs 22, 24, and 26 define valleys 28 and 30 between adjacent legs. The legs 22, 24, and 26 run the longitudinal length of the elongated strip portion and join at the ends. The legs 22, 24 and 26 enhance bonding of strip 12 to the backing member 14. The legs 22 and 24 are joined by a web portion 32 which includes extending leg 26. The valleys 28 and 30 add to the light-weight characteristics of the trim strip 10.

Figure 2:
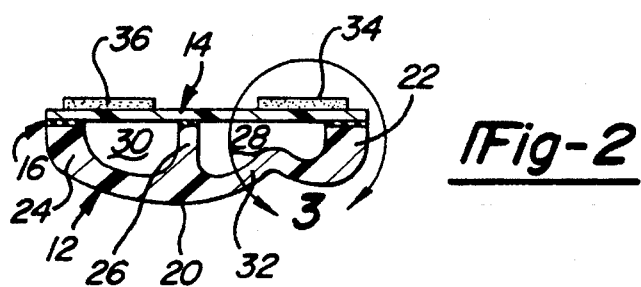
FIG. 2 is a cross-section view of the assembled trim strip of FIG. 1.
Figure 3:
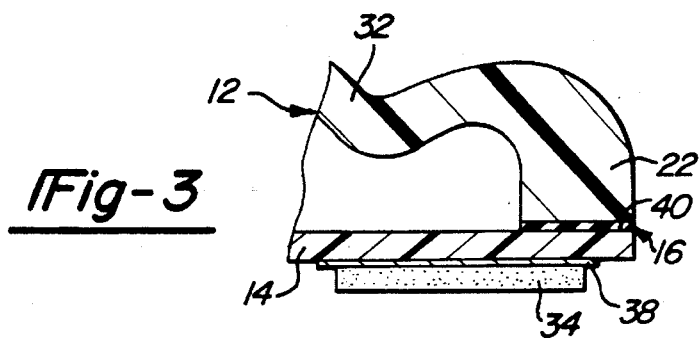
FIG. 3 is an enlarged cross-section view of FIG. 2 within circle 3.
Figure 5:
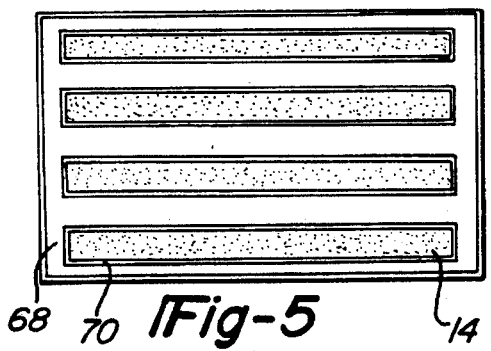
FIG. 5 is a plan view in the direction of arrow 5 of FIG. 4.
Figure 6:
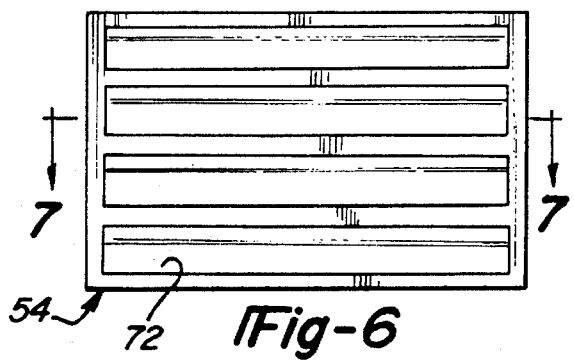
FIG. 6 is a plan view in the direction of arrow 6 of FIG. 4.

The backing member 14 is generally a planar strip which may be formed of a hard pvc material or thin metal such as aluminum. The backing strip 14 may include one or more double face bonding tape members 34 and 36 to enable attachment of the trim strip 10 to a surface. The tape members 34 and 36 are generally applied at the edges of the backing strip 14 and run the longitudinal length of the strip 14 as seen in FIGS. 1 through 3. Also, optionally, a thin metal 38, such as aluminum may be added to the backing member prior to the addition of the tape members 34 and 36 to the backing member 14. Also, if desired a continuous single tape member could be utilized across the entire backing member 14.

The bonding means 16 is generally of the adhesive type. However, certain chemicals (solvents) which react with the plastic material used to make the legs 22 and 24 may also be used. Air dried adhesives which are heat activated are preferably used. The adhesive bonds the substantially flat ends 40, 42, and 44 of the leg members 22, 24, and 26 to one side of the backing strip 14 as seen in FIGS. 2 and 3.

Once the backing strip 14 is bonded to the strip portion 12, hollow cavities are defined between the legs 22, 24, and 26, web 32, and backing strip 14. Thus, a lightweight hollow cavity trim strip is formed.

In an alternate embodiment, a foam insert 19 is placed or bonded within the valley 28, 30 prior to the bonding of the backing member 14 with the elongated strip portion 12, as seen in FIG. 28. The foam 19 provides support to the strip 10 when it is necessary. Also, liquid foam material could be injected into the hollow cavities 28 and 30 after the forming of the trim strip.

Another embodiment of the invention is shown in FIG. 2A. The strip portion 112 has an outer surface 120 which provides the trim strip with its aesthetic appearance. The strip portion 112, in cross-section, includes at least two pair of legs 122 and 124 and 126 and 128. The legs 122, 124, 126 and 128 define valleys 130, 132 and 134 between adjacent legs. The legs 122, 124, 126 and 128 run the longitudinal length of the elongated strip portion and join at the ends. The legs 122, 124, 126 and 128 enhance bonding of strip 112 to the backing member 114. The legs 122 and 124 and 126 and 128 and legs 124 and 128 are joined by web portions 136, 138 and 140, respectively. The valleys 130, 132 and 134 add to the lightweight characteristics of the trim strip 110.

The backing members 114 are generally planar strips which may be formed of a hard pvc material or thin metal such as aluminum. The backing strips 114 may include double face bonding tape members 142 and 144 to enable attachment of the trim strip 110 to a surface. The tape members 142 and 144 are generally applied along the backing strips 114 and run the longitudinal length of the strip 114. Also, optionally, a thin metal (not shown), such as aluminum, as explained above, may be added to the backing member prior to the addition of the tape members 142 and 144 to the backing member 114.

The bonding means 116 is the same as bonding means 16 described above.

Turning to FIGS. 4–7, apparatus to carry out the method of the present invention is shown. Generally, an injection molding machine 50 with a mold pair 52 and 54 is used to manufacture the elongated strip portion 12. The molds have a plurality of cavities to produce the desired shape and configuration of the trim strip portion 12. A shuttle mechanism 56 may be utilized to move the bottom mold 54 from the injection molding machine 50 to bonding station 60. At the bonding station 60, a movable heater 62 is enabled to be positioned over the bottom mold 54 to heat the elongated strip portion after molding. Once the strip is heated and the heater moved away, the plate assembly 64 is moved towards the mold 54 via power cylinder 66. The plate assembly 64 includes a (silicone) rubber nest 68 best illustrated in FIG. 5 which has a plurality of cavities 70 to receive the backing strip members 14. The plate 64 includes a vacuum system to retain the backing strips 14 onto the plate prior to bonding with the elongated strips 12 in mold 54. While a vertical apparatus is shown in FIG. 4, it is understood that a horizontal apparatus could be used.

The bottom mold 54 includes a corresponding number of cavities 72 to that of the plate assembly. The original mold 54 from the injection molding machine may be shuttled to the plate assembly and used as seen in FIG. 4. Also, the molded strip portion 12 may be removed from mold 54 and placed into a second cavity of a much lighter construction mold. The second mold would then be used in the manufacturing of the hollow trim strip of the present invention.

Backing strip 14 is provided in straight length or roll form. Thin aluminum, if desired, is bonded on one side of the strip 14. The double sided bonding tape is laminated directly onto either the backing member or the aluminum. Once the tape is on the backing strip 14, the laminate is blanked or cut to a desired length and shape. The backing strip 14 is then placed in the plate assembly 64 and is ready to bond with strip portion 12.

Elongated strip portions 12 are injection molded. After a desired time, mold halves 52 and 54 are separated. The mold 54 with the strip portions 12 is shuttled to the plate assembly bonding station 60. The strip portion shrinks in the mold 54. If the process is to be continued out in the original injection mold 54, the mold is shuttled directly to the bonding station 60 as seen in FIG. 4. If a lighter weight cavity is to be used, the injection molded strip portions 12 are removed from the injection mold and placed into an additional lightweight cavity (not shown). Either mold or cavity is positioned underneath the movable heater 62 and is heated for a desired period of time. Radiant heating takes place for a time of approximately 10 seconds. The backing strip 14 on its opposite side includes a heat activated adhesive material 16. After radiant heating of the elongated strip surfaces of the legs 22, 24 and 26, the heater is moved away and the backing strips 14 with the adhesive are quickly lowered, via the plate assembly, onto the hot strip legs 22, 24 and 26. The adhesive 16 is activated and bonds the backing strip 14 to the surfaces 40, 42, and 44 of the legs 22, 24, and 26. After a desired period of time, the plate assembly is raised from the cavity and the composite trim strip with a hollow cavity is removed from the mold cavity.

The trim strip 10 is lightweight and may have a high gloss and metallic appearance if desired. The trim strip 10 has little or no metallic flow lines because of the thinner wall thickness of web portion 32. Also, the strip 10 has a continuous surface with contoured finished ends which eliminate joint lines. Also, due to the tension in the tape members, the trim strip 10 is straight or longitudinally curved along the backing member for full bonding capability application to a surface.

Also the present invention could be utilized to manufacture solid strips which eliminate the legs and valleys. The strips would be solid with the backing strips applied thereto as described herein.

While the above detailed description describes the preferred embodiment of the present invention, the invention is susceptible to modification, variation, and alteration without deviating from the scope and fair meaning of the subjoined claims.

What is claimed is:

1. A method of forming an automotive trim strip comprising:

injection molding an elongated strip portion in a mold, said strip portion including at least two side walls defining a valley between said at least two side walls, said base strip having a desired length and width;

removing said strip portion from said mold and positioning said strip portion in a second mold;

providing a separate backing strip having a length with substantially the same length as said base strip;

applying an adhesive means on said backing strip to adhere said backing strip to said side walls;

bonding said backing strip to said at least two side walls;

attaching a securement means to said backing strip; and forming a trim strip having a hollow cavity defined by said at least two side walls and said backing strip.

2. The method according to claim 1 further comprising radiant heating the end surfaces of said side walls to be adhered to said strip portion for adhering said strip portion to said backing strip.

3. The method according to claim 1 wherein said securing means is double faced bonding tape.

4. The method according to claim 1 further comprising bonding a thin metal strip to said backing strip.

5. The method according to claim 1 further comprising injecting foam into said hollow cavity.

* * * * *